US012578574B2

(12) United States Patent
Huang

(10) Patent No.: US 12,578,574 B2
(45) Date of Patent: Mar. 17, 2026

(54) HEAD MOUNTED DISPLAY, AND NEAR-TO-EYE DISPLAY METHOD

(71) Applicant: Interface Advanced Technology (Chengdu) Co., Ltd., Chengdu (CN)

(72) Inventor: Jun Huang, Chengdu (CN)

(73) Assignee: Interface Advanced Technology (Chengdu) Co., Ltd., Chengdu (CN)

( * ) Notice: Subject to any disclaimer, the term of this patent is extended or adjusted under 35 U.S.C. 154(b) by 11 days.

(21) Appl. No.: 18/705,487

(22) PCT Filed: Jan. 5, 2024

(86) PCT No.: PCT/CN2024/070719

§ 371 (c)(1),
(2) Date: Apr. 26, 2024

(87) PCT Pub. No.: WO2024/250672

PCT Pub. Date: Dec. 12, 2024

(65) Prior Publication Data

US 2025/0291180 A1 Sep. 18, 2025

(30) Foreign Application Priority Data

Jun. 8, 2023 (CN) .......................... 202310680500.3

(51) Int. Cl.
*G02B 27/01* (2006.01)
*G06F 3/01* (2006.01)
*G09G 3/00* (2006.01)

(52) U.S. Cl.
CPC ..... *G02B 27/0101* (2013.01); *G02B 27/0149* (2013.01); *G02B 27/0179* (2013.01);
(Continued)

(58) Field of Classification Search
CPC ............ G02B 27/0101; G02B 27/0149; G02B 27/0179; G02B 2027/011;
(Continued)

(56) References Cited

U.S. PATENT DOCUMENTS

2019/0324276 A1* 10/2019 Edwin ..................... G06V 20/20
2021/0088790 A1* 3/2021 Forster .............. G02B 27/0176

FOREIGN PATENT DOCUMENTS

CN 108663799 A 10/2018

* cited by examiner

*Primary Examiner* — Brent D Castiaux
(74) *Attorney, Agent, or Firm* — ScienBiziP, P.C.

(57) ABSTRACT

The present disclosure provides a head mounted display includes a display assembly to display a compensated image, an imaging assembly to modulate the compensated image into a near-to-eye image and projects the near-to-eye image to a user's eye, a driving device connects with the imaging assembly for adjusting a position of the imaging assembly, an eye tracking device to obtain an outline image of the eye, and a processor. The processor electrically connects with the eye tracking device and the driving device to calculate a gaze position of the eye on the display assembly according to the outline image, and is used to transmit a control signal to the driving device to make the driving device adjust a position of the imaging assembly according to the control signal, so that an optical axis of the image module coincides with the gaze position. The processor also electrically connects with the display assembly to generate the compensated image centered on the gaze position. The present disclosure also provides a near-to-eye display method.

19 Claims, 5 Drawing Sheets

100

(52) U.S. Cl.
CPC ............. *G06F 3/013* (2013.01); *G09G 3/001*
(2013.01); *G02B 2027/011* (2013.01); *G02B*
*2027/0154* (2013.01); *G02B 2027/0187*
(2013.01); *G09G 2340/0464* (2013.01); *G09G*
*2354/00* (2013.01)

(58) Field of Classification Search
CPC .... G02B 2027/0154; G02B 2027/0187; G02B
27/0093; G02B 27/0172; G06F 3/013;
G06F 3/011; G06F 2203/012; G09G
3/001; G09G 2340/0464; G09G 2354/00
See application file for complete search history.

r3 r2 r1 r0

O

Y

X

Obtaining an outline image of the eye to calculate a gaze position of the eye — S1

Generating a compensation image, wherein a center of the compensation coincides with the gaze position — S2

Adjusting a position of the imaging module to make an optical axis of the imaging module coincides with the gaze position — S3

HEAD MOUNTED DISPLAY, AND NEAR-TO-EYE DISPLAY METHOD

CROSS-REFERENCE TO RELATED DISCLOSURES

This disclosure claims the benefit of priority of Chinese Disclosure No. 202310680500.3 filed on Jun. 8, 2023 and titled "HEAD MOUNTED DISPLAY AND NEAR-TO-EYE DISPLAY METHOD," the contents of which are incorporated by reference herein.

FIELD

The subject matter herein generally relates to display technique, particularly relates to a head mounted display, and a near-to-eye display method.

BACKGROUND

Existing near-to-eye displays based on virtual reality (VR) usually project images displayed by displays to user's eyes via lens modules. Since images projected by lens modules have distortions due to the structure of lens modules, the images displayed on displays are usually processed by anti-distortion in advance. That is, images on display are compensated images, and lens modules transmits the compensated images into corrected near-to-eye images observed by users. However, the greater the degree of distortion of the compensated images, the less clear the near-to-eye images. An optical axis of the existing lens modules are usually fixed and coincides with a center of the display assemblies, causing clarities of images displayed ate edges of display assemblies is poor. When user's eyes focus on edges of display assemblies, poor clarities of images affect the use experience.

SUMMARY

A first aspect of the present disclosure provides a head mounted display including a display assembly configured for displaying a compensated image; an imaging assembly configured for modulating the compensated image into a near-to-eye image and projecting the near-to-eye image to a user's eye; a driving device connected with the imaging assembly for adjusting a position of the imaging assembly; an eye tracking device configured for obtaining an outline image of the eye; and a processor electrically connected with the eye tracking device and the driving device; the processor is configured for calculating a gaze position of the eye on the display assembly according to the outline image, and configured for transmitting a control signal to the driving device to adjust the position of the imaging assembly, so that an optical axis of the imaging assembly coincides with the gaze position of the eye; the processor also electrically connects with the display assembly for generating the compensated image centered on the gaze position.

The head mounted display provided in the present disclosure is conducive to calculating the gaze position of the eye by setting the eye tracking device and the processor. And by setting the drive device to adjust the position of the imaging module, the optical axis of the imaging assembly can move with the gaze center of the eye. And by generating the compensated image centered on the gaze position, the position of the eye gaze always has higher clarity and less distortion, which is conducive to improving the visual experience.

In at least one embodiment, the processor is configured for setting a position of each pixel of the near-to-eye image on the display assembly corresponding to the compensated image according to a distance between each pixel and the gaze position.

In at least one embodiment, the processor is configured for calculating an angle at which the imaging assembly needs to move based on the gaze position to generate the control signal.

the driving device comprises a first driving device and a second driving device; the first driving device is configured for controlling the optical axis of the imaging assembly to move in a first direction; the second driving device is configured for controlling the optical axis of the imaging assembly to move in a second direction.

In at least one embodiment, the imaging assembly comprises a single lens.

In at least one embodiment, the imaging assembly comprises a lens group.

In at least one embodiment, a position adjustment range of the imaging assembly is greater than a rotation range of the eye.

A second aspect of the present disclosure provides a near-to-eye display method for projecting a near-to-eye image into a user's eye by an imaging assembly, the method including: obtaining an outline image of the eye to calculate a gaze position of the eye; generating a compensated image, wherein a center of the compensated image coincides with the gaze position; adjusting a position of the imaging assembly to make an optical axis of the imaging assembly coincides with the gaze position.

The near-to-eye display method provided in the present disclosure can make the position of the eye gaze always has higher clarity and less distortion by calculating the gaze position of the eye, adjusting the position of the imaging assembly and the center position of the compensated image according to the gaze position, which is conducive to improving the resolution of the image and improving the visual experience.

In at least one embodiment, generating the compensated image and adjusting the position of the imaging assembly are performed at the same time.

In at least one embodiment, the imaging assembly is configured for modulating the compensated image into the near-to-eye image; and generating the compensated image comprises calculating a position of each pixel corresponding to the compensated image according to a distance between each pixel on the near-to-eye image and the gaze position.

In at least one embodiment, generating the compensated image further includes setting different compensation coefficients of each pixel on the near-to-eye image to obtain the position of each pixel on the compensated image.

In at least one embodiment, the near-to-eye display method further includes calculating an angle at which the imaging assembly needs to move to make the optical axis coincides with the gaze position before adjusting a position of the imaging assembly.

In at least one embodiment, adjusting a position of the imaging assembly comprises controlling the optical axis of the imaging assembly moves on a first direction and a second direction respectively.

In at least one embodiment, obtaining the outline image of the eye to calculate a gaze position of the eye, generating the compensated image, and adjusting the position of the imaging assembly are continuously performed according to movements of the eye.

In at least one embodiment, the near-to-eye display method is configured for driving a head mounted display, the head mounted display includes: a display assembly configured for displaying the compensated image; the imaging assembly configured for modulating the compensated image into the near-to-eye image and projecting the near-to-eye image to the eye; a driving device connected with the imaging assembly for adjusting a position of the imaging assembly; an eye tracking device configured for obtaining the outline image of the eye; and a processor electrically connected with the eye tracking device and the driving device; the processor is configured for calculating the gaze position of the eye on the display assembly according to the outline image, and configured for transmitting a control signal to the driving device to adjust the position of the imaging assembly, so that the optical axis of the imaging assembly coincides with the gaze position of the eye; the processor also electrically connects with the display assembly for generating the compensated image centered on the gaze position.

In at least one embodiment, generating the compensated image includes calculating a position of each pixel on the compensated image according to a distance between each pixel on the near-to-eye image and the gaze position, and showing the compensated image on the display assembly.

In at least one embodiment, the near-to-eye display method further includes calculating an angle at which the imaging assembly needs to move to make the optical axis coincide with the gaze position, and generating the control signal before adjusting a position of the imaging assembly.

In at least one embodiment, obtaining an outline image of the eye to calculate a gaze position of the eye further includes calculating a gaze direction of the eye according to the outline image, and calculating the gaze position on the display assembly according to the gaze direction and a distance between the eye and the display assembly.

In at least one embodiment, the driving device includes a first driving device and a second driving device; adjusting a position of the imaging assembly includes controlling the optical axis of the imaging assembly moves on a first direction by the first driving device and controlling the optical axis of the imaging assembly moves on a second direction by the second driving device.

In at least one embodiment, generating the compensated image on the display assembly and adjusting the position of the imaging assembly by the driving device are performed at the same time.

DESCRIPTION OF SYMBOLS OF MAIN COMPONENTS

Figure 1:
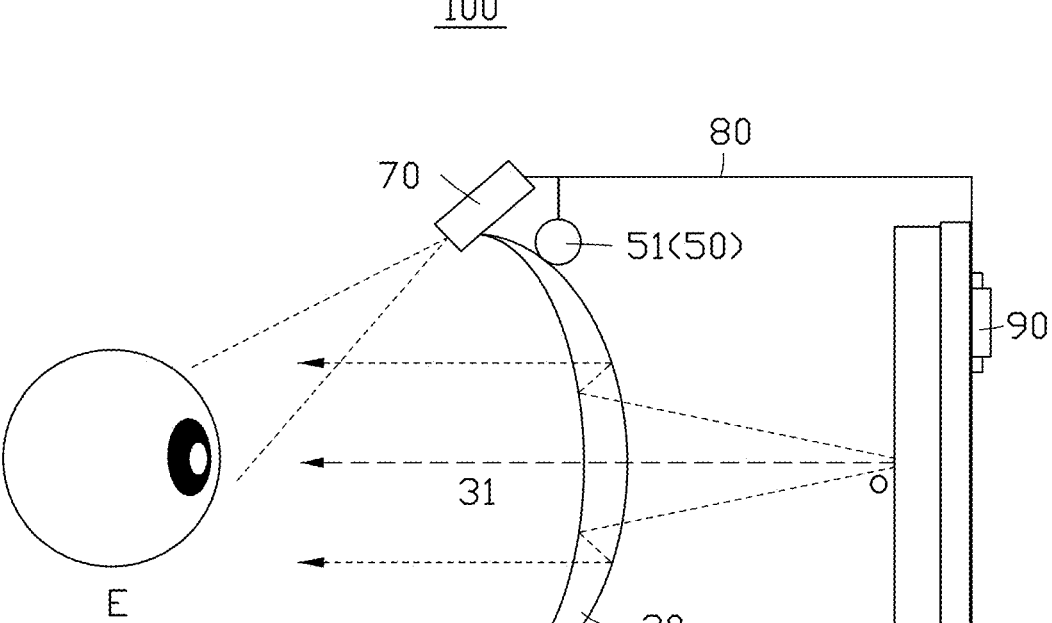
FIG. 1 shows a head mounted display according to an embodiment of the present disclosure.

Head mounted display 100
Display assembly 10
Imaging assembly 30

Optical axis 31
Driving device 50
First driving device 51
Second driving device 53
Eye tracking device 70
Connecting line 80
Processor 90
Eye E
Gaze position O 、O'
First direction X
Second direction Y
Distance r0 、r1 、r2 、r3
Block S1 、S2 、S3 、S4

The following specific embodiments will further illustrate the present disclosure in conjunction with the above drawings.

DETAILED DESCRIPTION

The following will provide a clear and complete description of the technical solution in the embodiments of this disclosure, in conjunction with the accompanying drawings. Obviously, the described embodiments are only a part of the embodiments of this disclosure, not all of them.

Unless otherwise defined, all technical and scientific terms used in this disclosure have the same meanings as those commonly understood by those skilled in the technical field of this disclosure. The terms used in the specification of this disclosure are only for the purpose of describing specific embodiments and are not intended to limit this disclosure.

In order to further elaborate on the technical means and effects adopted to achieve the intended purpose of this disclosure, the following is a detailed explanation of this disclosure, combined with the accompanying drawings and preferred implementation methods.

As FIG. 1 shows, a head mounted display 100 according to an embodiment of the present disclosure includes a display assembly 10, an imaging assembly 30, a driving device 50, an eye tracking device 70, and a processor 90. The display assembly 10 is used to display a compensated image. The imaging assembly 30 is used to modulating the compensated image into a near-to-eye image, and project the near-to-eye image into a user's eye E. The driving device 50 connects with the imaging assembly 30 to adjust a position of the imaging assembly 30. The eye tracking device 70 is used to obtain an outline image of the eye E. The processor 90 electrically connects with the display assembly 10, the driving device 30, and the eye tracking device 70. The processor 90 is used to calculate a gaze position O of the eye E according to the outline image, and transmit a control signal to the driving device 50 to adjust the position of the imaging assembly 30, so that an optical axis 31 of the imaging assembly 30 coincides with the gaze position O. The processor 90 is also used to generate the compensated image centered on the gaze position O.

The display assembly 10 can be a liquid crystal display assembly or a self-luminous display assembly such as a micro light-emitting diode display assembly, which is not limited in the present disclosure.

The imaging assembly 30 can be a single lens or a combination of multiple lenses. For example, the imaging assembly 30 is a Fresnel lens or includes a plurality of lenses and optical films to form a pancake lens with a folded optical path, which is not limited in the present disclosure.

Figure 2:
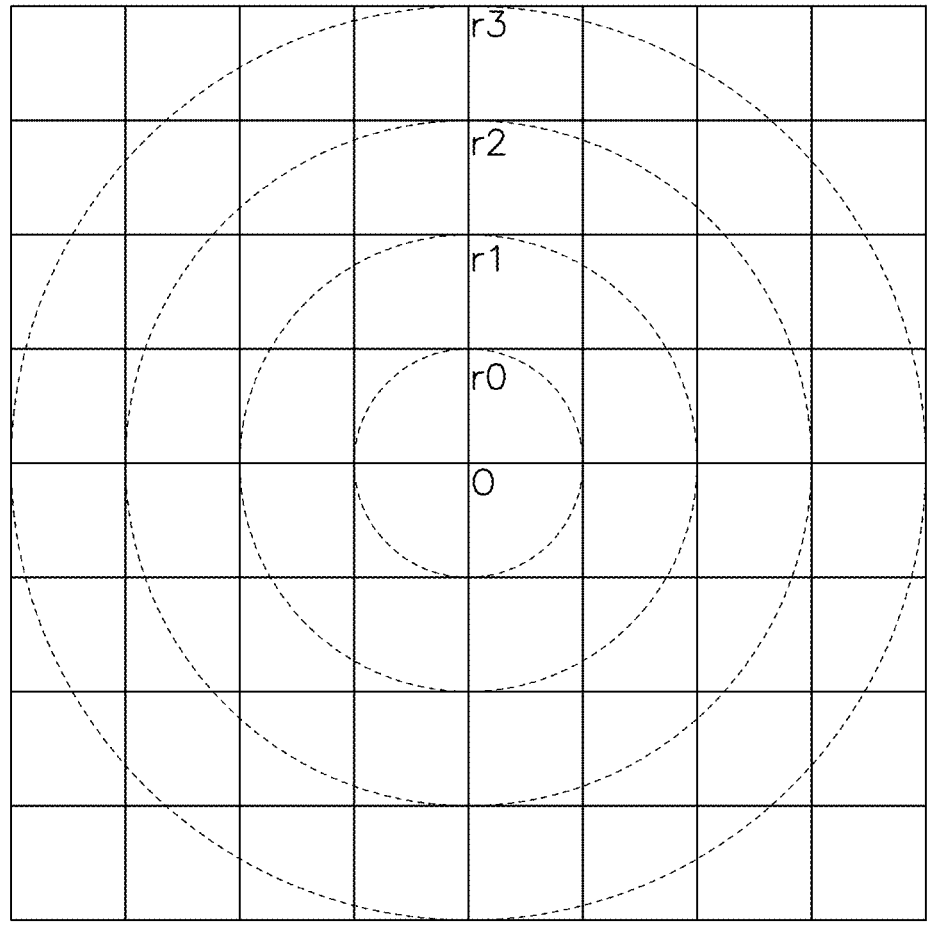
FIG. 2 shows a relative position of an imaging assembly and a display assembly in FIG. 1.
Figure 2:
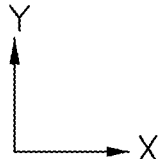

As shown in FIG. 1 and FIG. 2. The driving device 50 includes a first driving device 51 and a second driving device 53. The first driving device 51 is used to adjust the position of the imaging assembly 30 to control the movement of the optical axis 31 on a first direction X. The second driving device 53 is used to adjust the position of the imaging assembly 30 to control the movement of the optical axis 31 on a second direction Y. Specifically, the first drive module 51 and the second drive module 53 are used to adjust the position of the imaging assembly 30 on different directions, so that the imaging assembly 30 can be rotated relative to the eye E. A position adjustment range of the imaging assembly 30 is greater than a rotation range of the eye E, so that when the eye E view at gaze position O on the display assembly 10, the imaging assembly 30 can be adjusted to make the optical axis 31 coincide with a gaze direction of the eye E.

The first driving device 51 and the second driving device 53 can be voice coil motors or other drive devices, which is not limited in the present disclosure.

The eye tracking device 70 is used to obtain the outline image of the eye E. Specifically, the eye tracking device 70 may include an infrared light source and an acquisition camera. The infrared light source emits an infrared light to the eye E, and the acquisition camera receives the infrared light reflected from eye E to obtain the outline image of the eye E. The outline image may include a corneal image, a pupil image, or other information which can help to calculate the gaze position O of the eye E, which is not limited in the present disclosure.

The processor 90 can be a central processing unit or an integrated circuit composed of a plurality of chips, which is not limited in the present disclosure.

The processor 90 electrically connects with the eye tracking device 70 by a connecting line 80. The processor 90 is used to receive the outline image from the eye tracking device 70, and calculates the gaze position O according to the outline image. Specifically, the outline image records information such as the cornea image or pupil image of the eye E. By calculating the information recorded in the outline image, the gaze direction of the eye E can be obtained. Since a distance between the eye E and the display assembly 10 is relatively fixed, the gaze position O on the display assembly 10 that the eye E is watching at can be calculated by calculating the gaze direction of the eye E.

Figure 3:
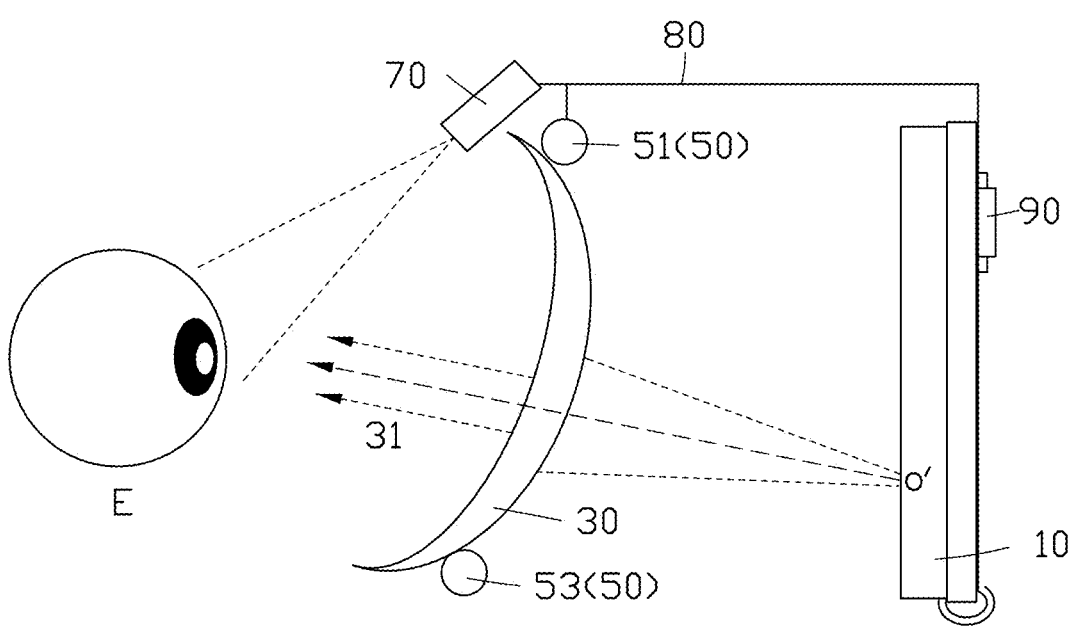
FIG. 3 shows an optical path of the head mounted display according to an embodiment of the present disclosure.
Figure 4:
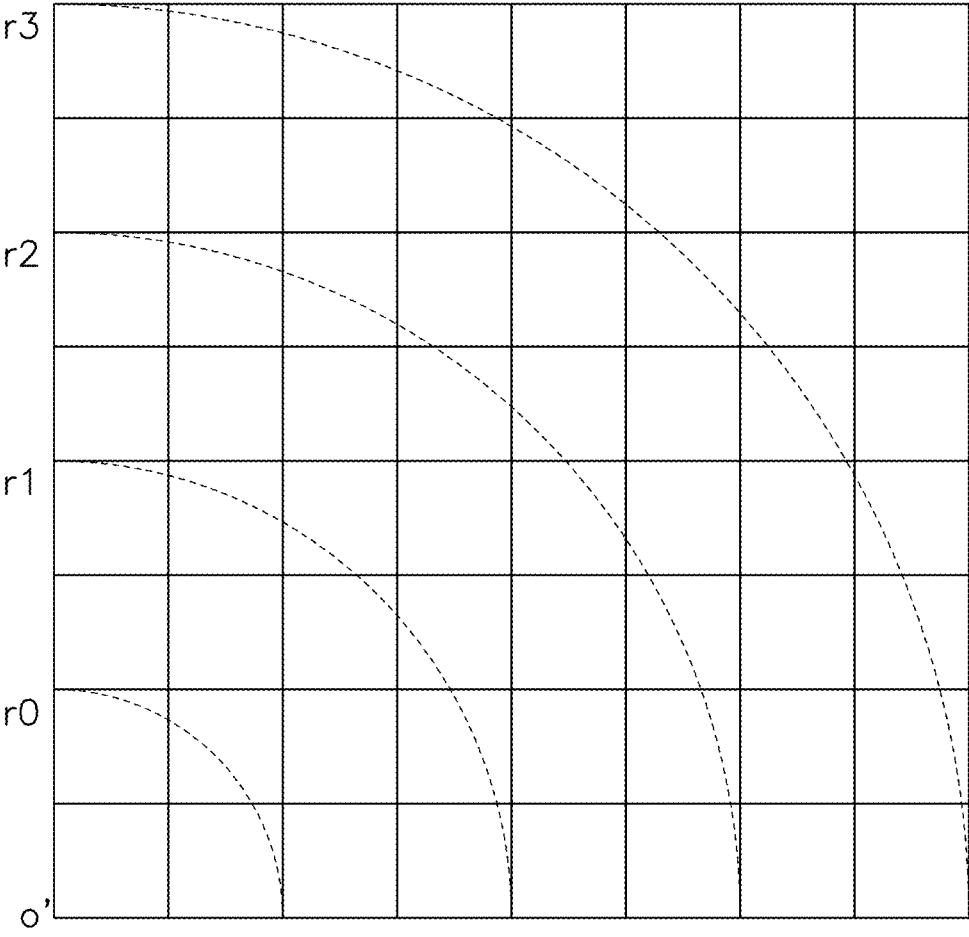
FIG. 4 shows a relative position of a imaging assembly and a display assembly in FIG. 3.
Figure 4:
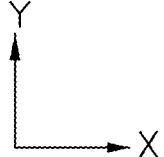

For example, as FIG. 3 and FIG. 4 shows. When the gaze position O of the eye E is shifted from a center position of the display assembly 10, the outline image obtained by the eye tracking device 70 will change due to a movement of the eye E. The processor 90 can calculate an angle of deflection of the eye E according to the change of the outline image, so as to calculate the gaze direction of the eye E. Since the distance between the eye E and the display assembly 10 is known, a corresponding new gaze position O' of the gaze direction of the eye E on the display assembly 10 can be calculated.

The processor 90 electrically connects with the driving device 50 by the connecting line 80. The processor 90 is used to calculate an angle at which the imaging assembly 30 needs to move according to the gaze position O' of the eye E, generates a control signal, and sends the control signal to the drive module 50. Specifically, after calculating the gaze position O', the processor 90 is used to calculate the angle at which the imaging assembly 30 needs to move from the present position to make the optical axis 31 coincides with the gaze position O'. The angle includes an first angle at which the imaging assembly 30 needs to move on the first direction X, and an second angle at which the imaging assembly 30 needs to move on the second direction Y. After calculating the first angle and the second angle, the processor 90 generates the control signal and sends the control signal to the driving device 50 to drive a movement of the imaging assembly 30.

Please refer to FIG. 1 to FIG. 4. The processor 90 electrically connects with the display assembly 10 by the connecting line 80. The processor 90 is used to generate the compensated image centered on the gaze position O. The processor 90 sets a position of each pixel of the near-to-eye image on the display assembly 10 corresponding to the compensated image according to a distance between each pixel and the gaze position O. Specifically, the compensated image is set corresponding to a degree of distortion of the imaging assembly 30. At a position near the optical axis 31, the degree of distortion of an image emitted from the display assembly 10 to the eye E is small. At a position far away from the optical axis 31, the degree of distortion of the image emitted from the display assembly 10 to the eye E is large. Different compensated coefficients need to be set according to the distance between each pixel on the display assembly 10 and the gaze position O to compensate for the distortion.

For example, when the gaze position O of the eye E is on a center of the display assembly 10 as FIG. 2 shows. Pixels on the display assembly 10 can be divided into r0, r1, r2, and r3 from near to far corresponding to distances between the pixels and the gaze position O. The distortion degree of the region r0 is the smallest, and the distortion degree of the region r3 is the largest. Different compensated coefficients can be set corresponding to different distances of the region r0, the region r1, the region r2, and the region r3 to generate the compensated images. When the eye E focuses on a lower left corner of the display assembly 10 as FIG. 4 shows. The gaze position O' is located on the lower left corner of the display assembly 10. Pixels on the display assembly 10 can also be divided into r0, r1, r2, and r3 from near to far corresponding to distances between the pixels and the gaze position O', so that a new compensated image can be generated.

In this embodiment, a location and number of distances divided by pixels on the display assembly 10 can be adjusted according to the degree of distortion of the imaging assembly 30. Specifically, the degree of distortion of the imaging assembly 30 is small near the optical axis 31 is small, so the region r0 can be set with a large range. The degree of distortion of the imaging assembly 30 away from the optical axis 31 is larger, and a change amplitude of the distortion is also accelerated, so the region r1, the region r2, and the region r3 can be set to be gradually dense. In other embodiments, more compensated regions can also be set corresponding to the imaging assembly 30 to improve a compensated effect of the compensated image.

The head mounted display 100 provided in the present disclosure, by setting the eye tracking device 70 to obtain the outline image of the eye E, the processor 90 can calculate the gaze position O of the eye E, and then calculate the angle that the imaging assembly 30 needs to move and generate the compensated image centered on the gaze position O. Then, the processor 90 can send the control signal to the driving device 50, and send the compensated image to the display assembly 10. As a result, the display assembly 10 can display the compensated image while the imaging assembly 30 is driven. When the eye E focuses on different positions on the display assembly 10, pictures with least degree of distortion and highest resolution can be provided by the head mounted display 100, so as to obtain the best visual effect and improve a use experience.

Figure 5:
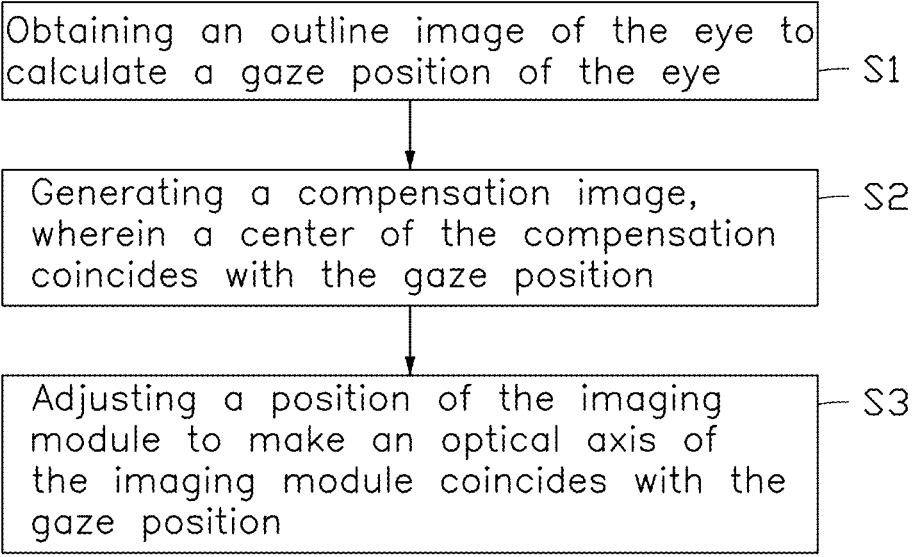
FIG. 5 shows a flow chart of a near-to-eye display method according to an embodiment of the present disclosure.

A near-to-eye display method is also provided in the present disclosure. The near-to-eye display method is used to project a near-to-eye image into a user's eye E by an imaging assembly. As FIG. 5 shows, the near-to-eye display method of an embodiment includes the following steps.

Block S1, an outline image of the eye E is obtained to calculate a gaze position O of the eye E.

Block S2, a compensated image is generated, and a center of the compensated image coincides with the gaze position O.

Block S3, a position of the imaging assembly 30 is adjusted to make an optical axis 31 of the imaging assembly 30 coincides with the gaze position O.

The near-to-eye display method above can be performed on the head mounted display 100 in the present disclosure. The near-to-eye display method is further explained in conjunction with the head mounted display 100. The near-to-eye display method can also perform on other head mounted displays capable of implementing the corresponding blocks, which is not limited in the present disclosure.

Block S1 includes: obtaining the outline image of the eye E by the eye tracking device 70. The outline image is used to calculate a gaze direction of the eye E. The outline image can include information such as cornea, pupil, and reflective area of the eye E. Block S1 further includes calculating the gaze position O on the display assembly 10 according to a distance between the eye E and the display assembly 10 after calculating the gaze direction of the eye E.

The process of block S2 and block S3 are performed at the same time. Specifically, block S2 is used to adjust the position of the imaging assembly 30, block S3 is used to display a corresponding compensated image on the display assembly 10 to compensate a distortion of the imaging assembly 30. As a result, when the optical axis 31 of the imaging assembly 30 and the center of the compensated image are all coincide with the gaze position O of the eye E, the near-to-eye image can be projected into the eye E.

Block S2 includes calculating a position of each pixel corresponding to the compensated image according to a distance between each pixel on the near-to-eye image and the gaze position. Specifically, the nearer the distance between the pixels on the near-to-eye image to be displayed and the gaze position O, the smaller the degree of distortion caused by the imaging assembly 30. The further the distance between the pixels on the near-to-eye image to be displayed and the gaze position O, the greater the degree of distortion caused by the imaging assembly 30. As a result, different compensated coefficients are needed to compensate the distortion according to the distance between each pixel and the gaze position O, so as to obtain the compensated image.

Before block S3, the near-to-eye display method further includes calculating an angle at which the imaging assembly 30 needs to move to make the optical axis 31 coincides with the gaze position O. Specifically, the position of the imaging assembly 30 changes with the change of the gaze position O. As a result, every time the recalculation of the gaze position O that the imaging assembly 30 needs to be adjusted to coincide with, the angle that the imaging assembly 30 needs to be adjusted should be recalculated based on the present position of the imaging assembly 30, so that the imaging assembly 30 can move to the corresponding position.

Block S3 further includes controlling the optical axis 31 of the imaging assembly 30 moves on a first direction X and a second direction Y. Specifically, the imaging assembly 30 is driven by the first driving device 51 and the second driving device 53, when adjusting the position of the imaging assembly 30, the imaging assembly 30 is driven to move on the first direction X and the second direction Y respectively.

Block S1, block S2 and block S3 are continuously performed. Specifically, the gaze position O changes with the movement of the eye E. In order to achieve the best visual effect, it is necessary to obtain the outline image of the eye E in real time to calculate the gaze position O of the eye E, drive the imaging assembly 30 and generate the compensated image continuously.

The near-to-eye display method provided in the present disclosure, by obtaining the outline image of the eye E, the gaze position O can be calculated, so as to adjust the position of the optical axis 31 of the imaging assembly to coincide with the gaze position O, and generate the corresponding compensated image. As a result, positions that the eye E focus on can always have the smallest distortion and the highest resolution, so as to keep the best viewing effect and improve the user's experience.

Finally, it should be noted that the above embodiments are only used to illustrate the technical solution of the present disclosure and not to limit the present disclosure. Although the present disclosure has been described in detail with reference to preferred embodiments, one ordinary skill in the art should understand that the technical solution of the present disclosure can be modified or equivalent replaced without departing from the spirit and scope of the technical solution of the present disclosure.

What is claimed is:

1. A head mounted display comprising:
   a display assembly configured for displaying a compensated image;
   an imaging assembly configured for modulating the compensated image into a near-to-eye image and projecting the near-to-eye image to an eye of a user;
   a driving device connected with the imaging assembly for adjusting a position of the imaging assembly;
   an eye tracking device configured for obtaining an outline image of the eye; and
   a processor electrically connected with the eye tracking device and the driving device; the processor is configured for calculating a gaze position of the eye on the display assembly according to the outline image, and configured for transmitting a control signal to the driving device to adjust the position of the imaging assembly, such that an optical axis of the imaging assembly coincides with the gaze position of the eye, wherein the processor further electrically connects with the display assembly and further configured for generating the compensated image centered on the gaze position; dividing pixels on the display assembly into a plurality of regions from near to far according to distances between the pixels and the gaze position wherein different compensation coefficients are set for the plurality of regions to compensate for a distortion of the imaging assembly.

2. The head mounted display of claim 1, wherein the processor is further configured for setting a position of each pixel of the near-to-eye image on the display assembly corresponding to the compensated image according to the distances between the pixels and the gaze position.

3. The head mounted display of claim 1, wherein the processor is further configured for calculating an angle to move the imaging assembly, based on the gaze position, to generate the control signal.

4. The head mounted display of claim 1, wherein the driving device comprises a first driving device and a second driving device; the first driving device is configured for controlling the optical axis of the imaging assembly to move in a first direction; the second driving device is configured for controlling the optical axis of the imaging assembly to move in a second direction.

5. The head mounted display of claim 1, wherein the imaging assembly comprises a single lens.

6. The head mounted display of claim 1, wherein the imaging assembly comprises a lens group.

7. The head mounted display of claim 1, wherein a position adjustment range of the imaging assembly is greater than a rotation range of the eye.

8. A near-to-eye display method for projecting a near-to-eye image into an eye of a user by an imaging assembly, the method comprising:

obtaining an outline image of the eye to calculate a gaze position of the eye;

generating a compensated image comprising: dividing pixels on the display assembly into a plurality of regions from near to far according to distances between the pixels and the gaze position; and setting different compensation coefficients for the plurality of regions to compensate for a distortion of the imaging assembly, wherein a center of the compensated image coincides with the gaze position;

adjusting a position of the imaging assembly to make an optical axis of the imaging assembly coincides with the gaze position.

9. The near-to-eye display method of claim 8, wherein generating the compensated image and adjusting the position of the imaging assembly are performed at the same time.

10. The near-to-eye display method of claim 8, wherein the imaging assembly is configured for modulating the compensated image into the near-to-eye image; and generating the compensated image comprises calculating a position of each pixel corresponding to the compensated image according to a distance between each pixel on the near-to-eye image and the gaze position.

11. The near-to-eye display method of claim 8, further comprising calculating an angle to move the imaging assembly to make the optical axis coincides with the gaze position before adjusting a position of the imaging assembly.

12. The near-to-eye display method of claim 8, wherein adjusting a position of the imaging assembly comprises controlling the optical axis of the imaging assembly moves on a first direction and a second direction respectively.

13. The near-to-eye display method of claim 8, wherein obtaining the outline image of the eye to calculate a gaze position of the eye, generating the compensated image, and adjusting the position of the imaging assembly are continuously performed according to movements of the eye.

14. The near-to-eye display method of claim 8, wherein the near-to-eye display method is configured for driving a head mounted display, the head mounted display comprises:

a display assembly configured for displaying the compensated image;

the imaging assembly configured for modulating the compensated image into the near-to-eye image and projecting the near-to-eye image to the eye;

a driving device connected with the imaging assembly for adjusting a position of the imaging assembly;

an eye tracking device configured for obtaining the outline image of the eye; and a processor electrically connected with the eye tracking device and the driving device; the processor is configured for calculating the gaze position of the eye on the display assembly according to the outline image, and configured for transmitting a control signal to the driving device to adjust the position of the imaging assembly, so that the optical axis of the imaging assembly coincides with the gaze position of the eye; the processor also electrically connects with the display assembly for generating the compensated image centered on the gaze position.

15. The near-to-eye display method of claim 14, wherein generating the compensated image comprises calculating a position of each pixel on the compensated image according to a distance between each pixel on the near-to-eye image and the gaze position, and showing the compensated image on the display assembly.

16. The near-to-eye display method of claim 14, further comprising calculating an angle at which the imaging assembly needs to move to make the optical axis coincide with the gaze position, and generating the control signal before adjusting a position of the imaging assembly.

17. The near-to-eye display method of claim 14, wherein obtaining an outline image of the eye to calculate a gaze position of the eye further comprises calculating a gaze direction of the eye according to the outline image, and calculating the gaze position on the display assembly according to the gaze direction and a distance between the eye and the display assembly.

18. The near-to-eye display method of claim 14, wherein the driving device comprises a first driving device and a second driving device; adjusting a position of the imaging assembly comprises controlling the optical axis of the imaging assembly moves on a first direction by the first driving device and controlling the optical axis of the imaging assembly moves on a second direction by the second driving device.

19. The near-to-eye display method of claim 14, wherein generating the compensated image on the display assembly and adjusting the position of the imaging assembly by the driving device are performed at the same time.

* * * * *